July 20, 1954
E. G. GOODWIN
2,684,130
BRAKE RIGGING
Filed March 10, 1950
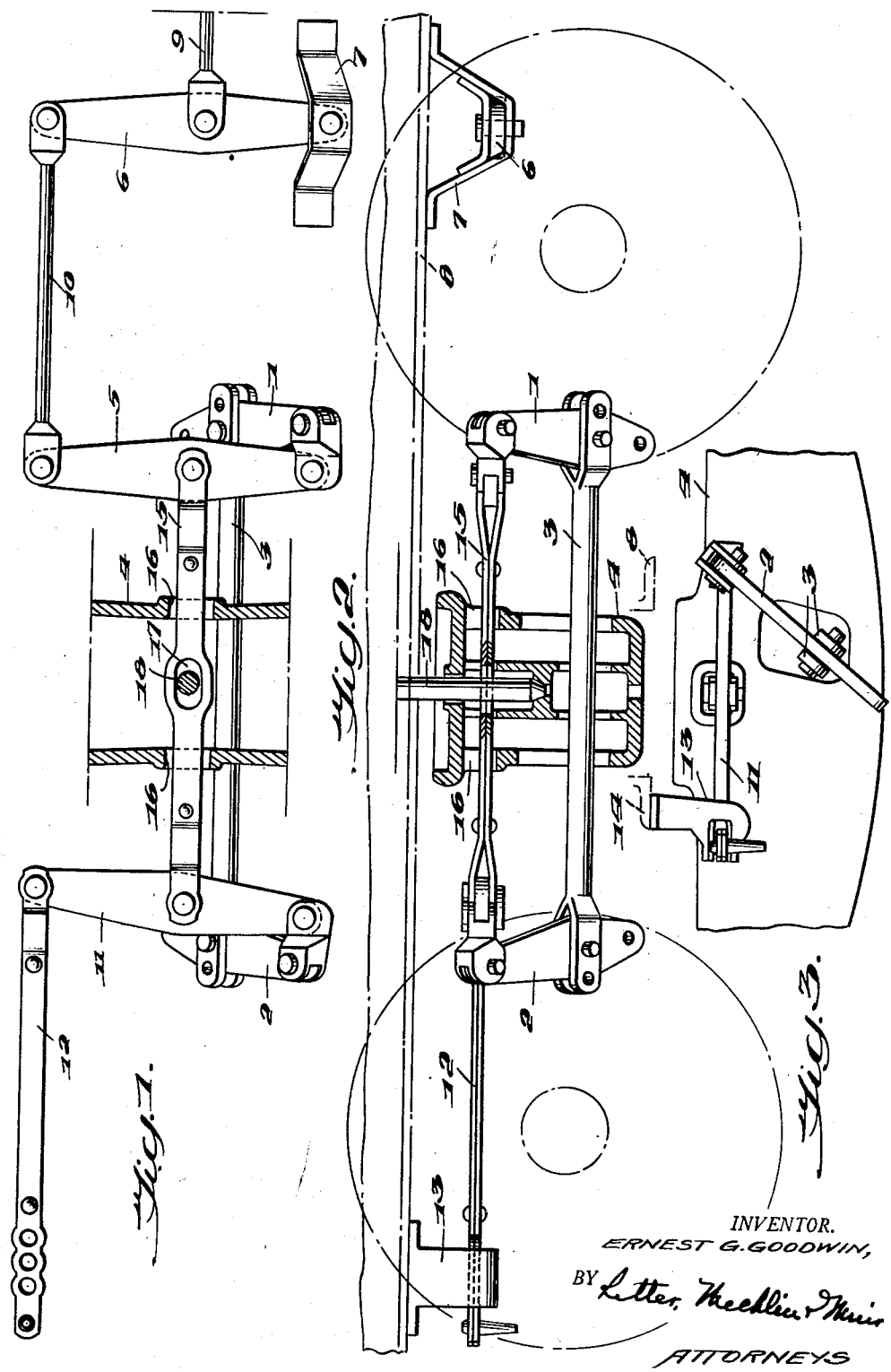
INVENTOR.
ERNEST G. GOODWIN,
BY
ATTORNEYS Patented July 20, 1954

2,684,130

UNITED STATES PATENT OFFICE 2,684,130

BRAKE RIGGING

Ernest G. Goodwin, Toledo, Ohio

Application March 10, 1950, Serial No. 148,863

7 Claims. (Cl. 188—33)

My invention relates to brake rigging for railway freight cars.

Because of the impossibility of connecting the dead lever of the brake rigging now customarily employed on railway freight cars with the underframe of the car and the practice of connecting the dead lever to the bolster of the associated car truck which because of its inclination is connected to the bolster at a point eccentric to the pivotal axis thereof, eccentric forces are imparted to the car truck whenever the brakes of the car are applied. Such forces tend to swivel the car truck and thereby force it out of square with the result that some parts thereof fail to perform their intended function and are subjected to abnormal wear.

The principal object of the present invention is, therefore, to provide a brake rigging for railway freight cars which does not impair the braking force delivered to the car wheels and yet enables the dead levers thereof to be connected to the underframe of the car.

The primary feature of the invention consists in providing the brake rigging with levers movable in horizontal planes respectively connected to the upper ends of the truck levers and pivotally connected to each other by means passing through the upper portion of the bolster of the associated car truck.

A further feature of the invention consists in providing the brake rigging with a pair of horizontally movable levers on one side of the bolster of the associated car truck, one of which is connected to the upper end of one of the truck levers and in providing another horizontally movable lever on the opposite side of the truck bolster which is connected at one end to the other truck lever and is connected at its opposite end to the underframe of the car.

Other and more specific features of the invention, residing in advantageous forms, combinations and relations of parts, will hereinafter appear and be pointed out in the claims.

In the drawing,

Figure 1 is a plan view of the invention.

Figure 2 is a side elevational view of the invention showing the adjacent portion of the center sill and the wheels of the car truck in dot and dash lines.

Figure 3 is an end view of the invention showing the outwardly extending marginal flanges of the center sill in dot and dash lines.

In the drawing illustrating the invention, 1 and 2 indicate the truck levers. These two levers are pivotally connected by a compression rod 3 which extends through the lower portion of the bolster 4 of the associated truck.

Movable in a substantially horizontal plane on one side of the truck bolster is a pair of levers 5 and 6 respectively, lever 5 being pivotally connected to the upper end of truck lever 1 and lever 6 being pivotally connected at one end to a bracket 7 rigidly secured to the underframe of the car, preferably to the adjacent lateral flange of the center sill shown in dot and dash lines as indicated at 8. Intermediate its ends lever 6 is pivotally connected to a pull rod 9 which is connected by a system of levers (not shown) to the usual brake applying cylinder (not shown). The free end of the levers 5 and 6 are pivotally connected together by a rod 10 whereby motion is imparted to lever 5 from lever 6.

On the opposite side of the truck bolster is another horizontally movable lever 11, one end of which is connected to the dead lever and the other end of which is connected through a strap 12 to a bracket 13 rigidly secured to a marginal flange of the center sill shown in dot and dash lines and indicated at 14.

Lever 11 is pivotally connected to lever 5 by a strap or the like 15 which passes through openings 16 formed in the sides of the upper portion of bolster 4. Strap 15 preferably extends through the pivotal axis of the bolster and the central portion thereof is formed with an opening 17 for receiving the king pin 18 of the truck.

This arrangement of levers and rods or straps will create the desired braking force in the truck without the introduction thereinto of the eccentric forces now resulting from the usual truck braking arrangement.

This is only possible in cases where the truck bolster is provided with openings 16 in the upper portion thereof for receiving means connecting the upper ends of the truck levers.

Various modifications may be made in the specific details and arrangement of parts herein shown without departing from the spirit and scope of the invention as defined in the appended claims.

What I claim is:

1. The combination with the brake rigging of a railway car having truck levers mounted on opposite sides of the bolster of a truck of the car and a king pin pivotally connecting the truck to the car, of a pair of connected levers movable in a substantially horizontal plane on one side of the truck bolster, a lever movable in a substantially horizontal plane mounted on the opposite side of the bolster, at least one of said pair and last mentioned levers being pivotally connected to the car, and means extending through the upper portion of the bolster pivotally connecting said last mentioned lever to the nearest one of the levers of said pair.

2. The combination with the brake rigging of a railway car having truck levers on opposite sides of the bolster of a truck of the car and a king pin pivotally connecting the truck to the car, of a pair of connected levers movable in a substantially horizontal plane on one side of the truck bolster, one of the levers of said pair being pivotally connected to the car and the other lever of said pair being pivotally connected to the upper end of one of said truck levers, a lever movable in a substantially horizontal plane on opposite side of the truck bolster and pivotally connected to the other of said truck levers, and means extending through the upper portion of the truck bolster pivotally connecting the horizontally movable levers connected to the truck levers, said means having an aperture through which said king pin passes.

3. The combination with the brake rigging of a railway car having truck levers on opposite sides of the bolster of a truck of the car and a king pin pivotally connecting the truck to the car, of a pair of connected levers movable in a substantially horizontal plane on one side of the truck bolster, a dead lever movable in a substantially horizontal plane on the opposite side of and detached from the bolster, means extending through the upper portion of the bolster pivotally connecting said last mentioned lever to the nearest one of the levers of said pair, and a compression rod extending through the lower portion of the bolster pivotally connecting the truck levers.

4. The combination with the brake rigging of a railway car having truck levers on opposite sides of the bolster of a truck of the car and a king pin pivotally connecting the truck to the car, of a pair of connected levers movable in a substantially horizontal plane on one side of the truck bolster, one of the levers of said pair being pivotally connected to the car and the other lever of said pair being pivotally connected to the upper end of one of the truck levers, and a lever movable in a substantially horizontal plane connected at one end to the other truck lever and connected at its other end to the underframe of the car, and means passing through said bolster for connecting the truck levers.

5. The combination with the brake rigging of a railway car having truck levers mounted on opposite sides of the bolster of a truck of the car and a king pin pivotally connecting the truck to the car, of a pair of connected levers movable in a substantially horizontal plane on one side of the truck bolster, one of the levers of said pair being pivotally connected to the car and the other lever of said pair being pivotally connected to the upper end of one of the truck levers, a lever movable in a substantially horizontal plane on the opposite side of the truck bolster connected at one end to the other truck lever and connected at its other end to the underframe of the car, and a compression rod extending through the lower portion of the truck bolster pivotally connecting the truck levers.

6. The combination with the brake rigging of a railway car having truck levers mounted on opposite sides of the bolster of a truck of the car and a king pin pivotally connecting the truck to the car, of a pair of connected levers movable in a substantially horizontal plane on one side of the truck bolster, one of the levers of said pair being pivotally connected to the car and the other lever of said pair being pivotally connected to the upper end of one of the truck levers, a lever movable in a substantially horizontal plane on the opposite side of the truck bolster connected at one end to the other truck lever and connected at its other end to the underframe of the car, and means extending through the upper portion of the truck bolster pivotally connecting the horizontally movable levers connected to the truck levers.

7. The combination with the brake rigging of a railway car having truck levers mounted on opposite sides of the bolster of a truck of the car, of levers movable in substantially horizontal planes on opposite sides of the truck bolster pivotally connected to the truck levers, means extending through the upper portion of the bolster pivotally connecting said horizontally movable levers, and a compression rod extending through the lower portion of the bolster pivotally connecting the truck levers.

References Cited in the file of this patent

UNITED STATES PATENTS

| Number | Name | Date |
| --- | --- | --- |
| 2,033,319 | Baselt | Mar. 10, 1936 |
| 2,176,177 | Hankins | Oct. 17, 1939 |